United States Patent [19]

Bailey

[11] 4,065,704
[45] Dec. 27, 1977

[54] STATIC SPEED CONTROL CIRCUIT FOR POLYPHASE INDUCTION MOTORS

[75] Inventor: Francis M. Bailey, Roanoke, Va.

[73] Assignee: General Electric Company, New York, N.Y.

[21] Appl. No.: 722,190

[22] Filed: Sept. 10, 1976

[51] Int. Cl.² .................................................. H02P 5/36
[52] U.S. Cl. ........................................ 318/237; 318/240
[58] Field of Search ................................ 318/237–240

[56] References Cited

U.S. PATENT DOCUMENTS

| 3,375,433 | 3/1968 | Haggarty et al. | 318/237 X |
| 3,529,224 | 8/1970 | Bedford | 318/237 |
| 3,657,622 | 4/1972 | Reuland et al. | 318/240 X |

*Primary Examiner*—Gene Z. Rubinson
*Attorney, Agent, or Firm*—Walter C. Bernkopf; Robert A. Cahill

[57] ABSTRACT

A modified three-phase bridge circuit, incorporating resistors and thyristors connected in specific configuration in one leg of each phase circuit and diodes in a second leg, is adapted for connection to the motor rotor. A speed control signal, modulated with a triangular waveform of predetermined frequency, below the instantaneous rotor frequency, is applied to a plurality of AND circuits acting as pulse width modulators. Each AND circuit has an output coupled to the gate of one thyristor in each phase circuit. Changes in speed control signal representative of calls for increasing speed produce sequentially, on successive outputs, a train of pulses increasing in pulse width to full turn on. Additional thyristors are thus gated on in each phase circuit to modify the effective resistance presented by the resistors in each leg so as to smoothly decrease the resistance of the bridge circuit.

18 Claims, 2 Drawing Figures

STATIC SPEED CONTROL CIRCUIT FOR POLYPHASE INDUCTION MOTORS

BACKGROUND OF THE INVENTION

This invention relates to speed control of polyphase induction motors, and in particular, to an improved static control circuit for changing the effective rotor winding resistance of wound rotor motors.

Induction motors of the wound rotor type are commonly controlled by adjustment of the resistance of the secondary, i.e. rotor winding circuit. Such motors typically have a threephase rotor winding. One end of each phase winding is brought out to slip rings on the motor shaft. Desirable values of resistance are added in circuit with the rotor winding through stationary brushes in contact with the slip rings.

Speed control of a wound rotor motor is accomplished by adjusting this external rotor resistance to provide the torque necessary to maintain the desired speed for a given load. The maximum motor torque is independent of the resistance in circuit with the secondary winding. However, the slip at which the maximum torque occurs is proportional to secondary resistance. Thus, with a relatively high secondary resistance, maximum torque occurs at a high slip, i.e. at a relatively low rotor speed, so as to provide high starting torque efficiency. A reduction of secondary resistance results in a reduction of slip, and thus, an increase in full load speed. This type of control is referred to as "rotor current" or "secondary resistance control."

Prior art rotor current controls commonly utilized combinations of resistors which were selectively connected in circuit by electromechanical contactors to provide the desired external resistance magnitude. However, particularly when the motor must operate at a continuously variable speed, contactor tip wear and mechanical survival of the contactors are a problem. Additionally, excessive contactors are needed to obtain smoothly varying values of resistors over a substantial resistance range.

Static control devices, i.e. thyristors, such as silicon controlled rectifiers and triacs have been utilized in rotor current control circuits to overcome the above-recited problems associated with mechanical contactors.

A variable resistance effect may be generated merely by repetitively switching a thyristor in circuit with the rotor phase windings. However, this results in a current wave form varying substantially between zero and a very high value limited only by the effective motor resistance, and is likely to result in excessive torque pulses and rotor heating.

Accordingly, it is desirable to utilize thyristors in series circuit with load impedances, e.g. resistors. However, static control circuits, including static rotor current control circuits have unique design considerations, including as to gating and commutating of the solid state devices.

U.S. Pat. No. 3,529,224 — Bedford, assigned to the assignee of this application, disclosed a number of static rotor control circuits wherein serially connected resistors and thyristors are arranged in delta and star configurations with the phase windings of a wound rotor motor. The anode-cathode circuits of the thyristors are in circuit with the phase windings. The thyristors are thus periodically cut off as the rotor winding phase current through the solid state device is cyclically reduced below a minimum holding current. The thyristors are thus line commutated, and no additional commutation circuits are required. The above-described circuits utilize one thyristor device per phase leg and employ phase control in which the thyristor is rendered conductive by the application of a gating signal at a selected phase angle of the alternating current signal induced in the rotor winding. Thus, during each time period during which the thyristor conducts, the thyristor is gated on at a desired phase angle intermediate the conduction cycle and conduction continues until the end of the conduction cycle when the current through the thyristor drops below the holding current. Gating signals for the thyristors in the three phase winding circuits are applied to the thyristors in sequence but at the same phase retard angle. Such phase control circuits may be quite complex, particularly because of the wide variations in rotor frequency occurring with changes in rotor speed. Modification of the phase retard angle from fully advanced firing results in increased ripple, i.e. cyclically occurring harmonics. Such harmonics are likely to cause undesirable motor heating and torque pulsations.

In an alternative static rotor current control system, also disclosed in the referenced Bedfore patent, the rotor winding voltages are rectified, such as by a diode bridge rectifier. The rectifier output is connected to a series circuit comprising a thyristor and a resistor, such that the thyristor controls current flow through the resistor. The thyristor is commutated by an external commutation and gating circuit so as to operate in a chopping or inverter mode. Typically, the chopping frequency is substantially greater than the rotor winding frequency and the pulse duty cycle is varied by time ratio control to adjust rotor current. While alleviating the above-described problems associated with phase control, such a system requires a forced commutation circuit, line voltage filtering, filtering of the chopping frequency by an inductor in the resistor-thyristor circuit, and a free-wheeling, or coasting, diode to discharge the filter inductor during intervals when the thyristor is cut off.

Accordingly, an object of the invention is to provide new and improved static speed control circuits for polyphase induction motors.

Another object is an improved static rotor current circuit for wound rotor motors of simple and economic construction.

A further object is an improved static secondary resistance control circuit for wound rotor motors designed to overcome the above-recited deficiencies of the prior art.

SUMMARY OF THE INVENTION

In accordance with the invention, a plurality of interconnected phase circuits, adapted for connection of the motor rotor windings, each comprise a plurality of resistance means and thyristor means. The resistance means and thyristor means of each phase circuit are connected such that conduction of additional ones of the thyristor means incrementally reduces the resistance of said phase circuit. The phase circuits may comprise a plurality of parallel connected networks, each comprising serially connected thyristor means and resistance means. Alternatively, the resistance means may be connected in series circuit with thyristor means connected in shunt with respective ones of said resistance means. The thyristor means are connected to be self-commutated. Control means responsive to a source of speed control signals has a plurality of outputs. Each output is coupled through different thyristor gating means to gate one of the thyristor means in each phase circuit. A three-phase full wave bridge may be utilized wherein one leg of each phase comprises the resistance means and thyristor means and the other leg comprises unilaterally conducting means.

Preferably, modulating means responsive to periodically varying signals are used to produce time ratio modulated signals on the outputs of the control means such that calls for increasing motor speed consecutively produce on successive outputs a train of pulse width modulated pulses varying from a predetermined minimum to a predetermined maximum duty cycle to smoothly vary the effective resistance of each phase circuit. The frequency of the train of pulses is asynchronous with, and substantially lower than, the motor rotor frequency.

The novel features believed characteristic of this invention are set forth with particularity in the appended claims. The organization and manner of operation of the invention, together with further objects and advantages thereof, may best be understood by reference to the following description taken in conjunction with the accompanying drawing in which:

DESCRIPTION OF THE PREFERRED EMBODIMENT

Figure 1:
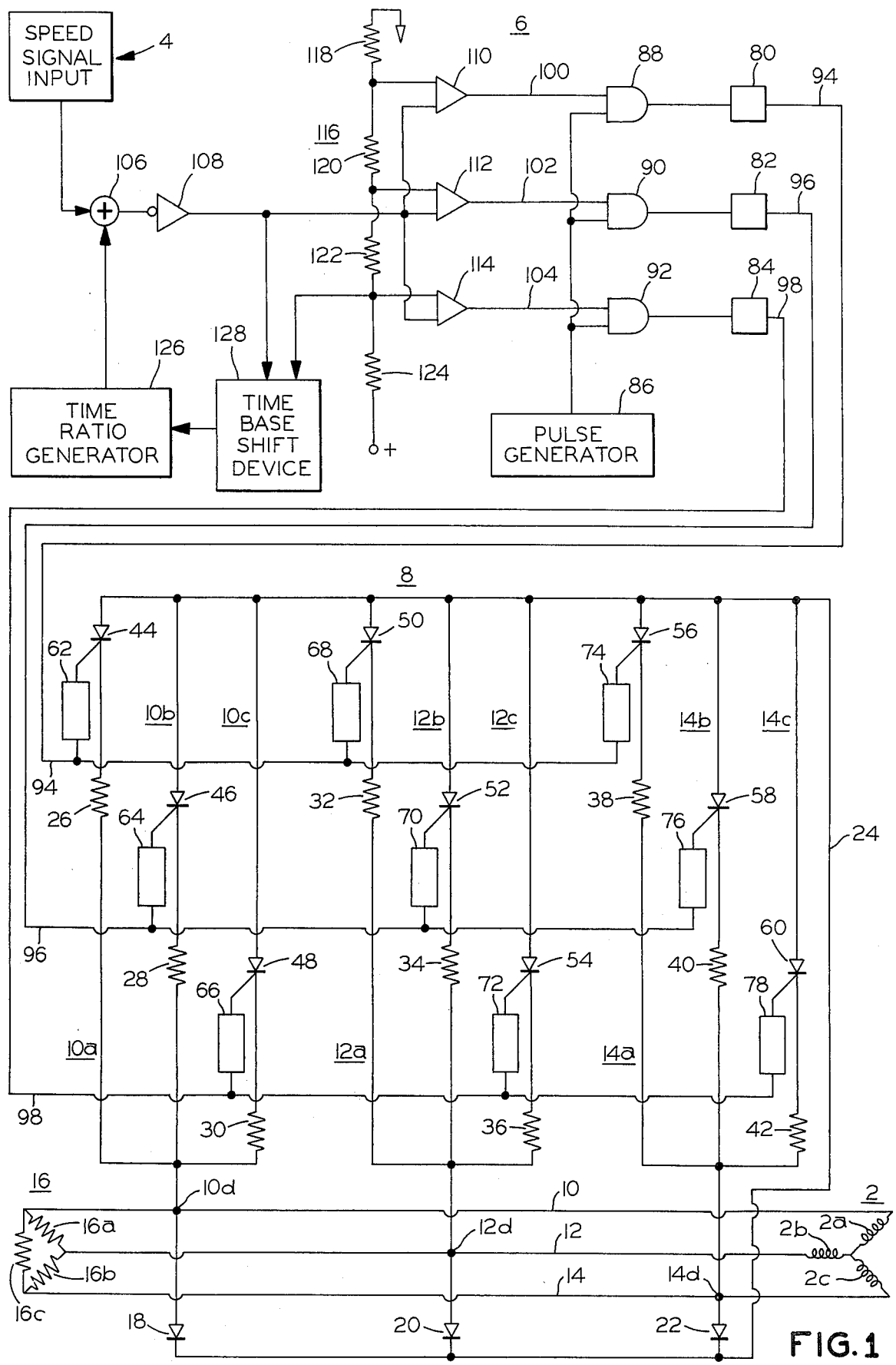
FIG. 1 is a simplified schematic diagram of a static motor speed control illustrating one embodiment of the invention.

FIG. 1 illustrates an improved static speed control ciucuit for an A.C. wound rotor motor having a rotor winding 2. Motors of this type are used, for example, to drive centrifugal pumps or fans, and their speed is controllable by applying a speed control signal from speed input 4 to control means 6 to vary the effective resistance of phase circuits 8 which are connected to the multiple phase windings 2a, 2b and 2c of the motor rotor winding. For example, the motor may be utilized in a liquid pumping system wherein a pressure transducer provides the speed control signal which is a function of liquid pressure to vary the speed of the pump motor so as to maintain required water pressure.

POLYPHASE NETWORK

FIG. 1 illustrates a three-phase wound rotor motor winding whose three Y connected phase windings 2a, 2b and 2c have their end terminals connected to lines 10, 12 and 14. These lines are connected to the starting resistance network 16 which provides appropriate starting load resistance. The network has starting resistors 16a, 16b and 16c connected in delta configuration, with resistor 16a connected to lines 10 and 12, resistor 16b connected to lines 12 and 14, and resistor 16c connected to lines 14 and 10. The relatively high resistance magnitude of the starting network 16 is preselected, as known in the prior art, to establish the desired starting torque and relatively low motor speed (high slip) during start-up conditions. For example, for pumping applications, the starting speed may be about 50%.

The motor speed is increased above the starting speed by decreasing the effective secondary resistance connected to the rotor winding 2 by phase circuits 8. In the preferred embodiment, which is adapted for 3 φ motor operation, the phase circuits 8 comprise a modified three-phase full wave bridge circuit whose three phase terminals 10d, 12d and 14d are connected to the terminals of the motor rotor windings via lines 10, 12 and 14.

Unilaterally conducting means are connected in a first leg of each phase circuit of the modified bridge. Specifically, unilaterally conducting means, e.g. diodes 18, 20 and 22 have one of their electrodes connected, respectively, to terminals 10d, 12d and 14d. A plurality of parallel connected networks are connected in a second leg of each phase circuit of the bridge. Specifically, networks 10a, 10b and 10c are shown connected in parallel and have one of their common terminals connected to terminal 10d. Similarly, the parallel connected networks 12a, 12b and 12c have a common terminal connected to terminal 12d, and parallel connected networks 14a, 14b and 14c have a common terminal connected to terminal 14d. The remaining terminals of networks 10a, 10b, 10c, 12a, 12b, 12c, 14a, 14b and 14c and the remaining terminals of the unilaterally conducting means 18, 20 and 22 are interconnected to each other by line 24.

Each of the networks comprises serially connected resistance means and thyristor means. In the preferred embodiment, network 10a comprises resistor 26 and thyristor 44. Network 10b comprises resistor 28 and thyristor 46. Networks 10c through 12c comprise, respectively, resistors, 30, 32, 34, 36, 38, 40 and 42, and thyristors 48, 50, 52, 54, 56, 58 and 60.

The thyristor means, 44, 46, 48, 50, 52, 54, 56, 58 and 60 are poled in a common direction in respect to line 24. Similarly, unilaterally conducting means 18, 20 and 24 are poled in a common direction in respect to line 24. The thyristor means connected to each phase terminal are poled in the opposite direction in respect to the unilaterally conducting means connected to the same phase terminal such that current flow between the phase terminal and the thyristor means is in an opposite direction in respect to current flow between that phased terminal and the unilaterally conducting means.

Current flow can occur in the phase circuits of the polyphase network, i.e. the 3 φ bridge, only when the thyristor means in the networks are gated on. Furthermore, the thyristors are connected such that once they are gated on, they are self-commutated, i.e. turned off, by the periodic reversal of the A.C. current supplied by the motor rotor winding to the polyphase network.

THYRISTOR GATING MEANS

As described subsequently, control means 6, of the preferred embodiment, produces on its output lines 100, 102 and 104, signals which may be switched between two predetermined voltage levels. Signsls of one of these voltage levels constitute enabling gates, which are converted by firing gating means, identified as 62, 64, 66, 68, 70, 72, 74, 76, 78, 80, 82, 84, 86, 88, 90 and 92, into thyristor trigger signals of proper parameter, i.e. gate current, voltage, frequency and pulse width. The preferred embodiment utilizes a separate pulse transformer for each thyristor, illustrated in FIG. 1 in block form and identified as 62, 64, 66, 68, 70, 72, 74, 76 and 78.

The conduction of each of the networks of any one phase circuit is controlled from a different one of the outputs of control means 6. Thus, for example, the signal on output 100 controls conduction of thyristor 44 of network 10a, the signal on output 102 controls conduction of thyristor 46 of network 10b, and the signal on output 104 controls conduction of thyristor 48 of network 10c.

In the preferred embodiment, corresponding networks on each of the phase circuits are controlled by the same output signal. The signal on output 100 controls conduction of thyristor 44 of network 10a, of thyristor 50 of network 12a, and of thyristor 56 of network 14a. Similarly, the signal on output 102 controls conduction of thyristor 46 of network 10b, of thyristor 52 of network 12b, and of thyristor 58 of network 14b. The signal on output 104 similarly controls conduction of networks 10c, 12c and 14c.

The signal on each of the output lines 100, 102, and 104 is modified by appropriate gating means into suitable trigger signals. These output signals either have a first predetermined voltage level (e.g. binary zero) during which the associated thyristors are to be cut off, or a second predetermined voltage level (e.g. binary one) during which the associated thyristors are to be gated on. Thus, signals of the second predetermined voltage level constitute enabling signals. As explained subsequently, the voltage levels on the outputs of the control means are switched at a rate substantially below the instantaneous frequency of the motor rotor current. The thyristor gating means of the preferred embodiment therefore incorporates pulse modulation circuitry for chopping enabling signals, i.e. output signals of the second predetermined voltage level in order to produce firing pulses of appropriate trigger frequency and trigger pulse width. This comprises pulse generator 86 and AND gates 88, 90 and 92. The pulse generator 86 produces pulses of desired frequency and pulse width, such as, for example, pulses having a frequency of 10 kilohertz and a duty cycle of 10 percent. These pulses are supplied to one input of each of the AND gates. Control lines 100, 102 and 104 are applied to a second input of, respectively, AND gates 88, 90 and 92. The pulses from generator 86 and those signals on outputs 100, 102 and 104 having the second predetermined voltage level are of the same polarity. Accordingly, during intervals when there are enabling signals, i.e. when a control means 6 output (100, 102 and 104) has a binary one level, indicative of thyristor conduction, the output of its associated AND gate (88, 90 and 92) produces appropriate firing pulses. The output of each AND gate is applied to a buffer circuit, such as a Darlington amplifier whose output is coupled to the inputs of its associated pulse transformer circuits. Thus, the AND gates 88, 90 and 92 are coupled respectively to buffers 80, 82 and 84. The output of buffer 80 supplies pulse transformers 62 (to gate thyristor 44 of network 10a), 68 (to gate thyristor 50 of network 12a), and 74 (to gate thyristor 56 of network 14a). Similarly, the output of buffer 82 is coupled to pulse transformers 64, 70 and 76, and the output of buffer 84 is coupled to pulse transformers 66, 72 and 78. Thus, gating means are coupled from each of the outputs of the control means and are connected to gate on, i.e. fire, the thyristor means in a specified network of each phase circuit of the polyphase network.

CONTROL MEANS

An external speed control signal is coupled from speed input source 4 to an input of control means 6. The control means produces signals on its outputs 100, 102 and 104 responsive to the magnitude of the speed control signal. If, for example, the magnitude of the speed control signal changes in a manner representative of calls for increasing motor speed, the control means will sequentially produce signals on consecutive ones of the outputs, so as to consecutively gate on the thyristor means of additional ones of the parallel connected networks of each phase circuit. Thus, the resistance means of additional ones of said parallel connected series networks are inserted in parallel in each phase circuit. The resulting reduction of the resistance coupled to the rotor windings of the motor effects the desired increase in speed.

In the preferred embodiment of FIG. 1, the speed control signal is applied from speed signal circuit 4 to one input of summation circuit 106. The output of the summation circuit is coupled through inverter 108 to a first input of each of AND gates 110, 112 and 114. A voltage divider circuit 116 is illustrated as comprising serially connected resistors connected intermediate a voltage source, so as to provide a plurality of different reference potentials. These are applied, respectively, to second inputs of the AND gates. Specifically, resistors 118, 120, 122 and 124 are shown connected intermediate a source of ground and of a positive potential. The junction of resistors 118 and 120 is coupled to the second input of AND gate 110 to supply, for example, a potential of two volts to the latter. The junction of resistors 120 and 122 is coupled to the second input of AND gate 112 to supply, for example, an input of four volts to the latter. The junction of resistors 122 and 124 is coupled to the second input of AND gate 114 to supply, for example, an input of six volts to the latter. For purposes of explanation, it is assumed that the speed control signal varies from zero volts (indicative of a minimum speed call) to a negative eight volts (indicative of a maximum speed call). This speed call signal is inverted by inverter 108 such that the speed control signal applied to the first inputs of the AND gates varies from zero volts to plus eight volts.

For purposes of explanation, the operation of time ratio generator 126 will initially be ignored. If the speed control signal has an amplitude below 2 volts, the outputs 100, 102 and 104 of the AND gates have a binary zero value, i.e. the outputs are at the first predetermined voltage level. None of the thyristors in the networks of the polyphase circuits are gated on and the secondary resistance applied to the motor rotor windings is equal to the resistance of the starting network. When the speed control signal exceeds two volts, AND gate 110 produces a binary one and the output 100 has a second predetermined voltage, i.e. enabling, level. As previously described, this results in the application of firing pulses to thyristors 44, 50 and 56. In the above-described arrangement, this essentially results in connecting the resistance means 26, 32 and 38 of the networks 10a, 12a and 14a in circuit with the motor rotor windings. This provides a stepped reduction of secondary resistance by essentially paralleling the resistance means of networks 10a, 12a and 14a with the starting resistance network and results in an incremental increase of motor speed.

Similarly, when the speed control signal exceeds four volts, AND gate 112 produces a binary one output, and the output 102 has a second predetermined voltage level, i.e. enabling, level. This results in gating on the thyristors of networks 10b, 12b and 14b. The resistance means 28, 34 and 40 of these networks are now essentially connected in parallel with the resistance means of networks 10a, 12a and 14a and with the starting resistance network so as to produce an additional incremental increase of motor speed.

When the speed control signal exceeds six volts, AND gate 114 produces on output 104 a signal having a second predetermined voltage, i.e. enabling, level. The thyristors of networks 10c, 12c and 14c are gated on an their resistance means are connected in parallel with the resistance means of the other networks and with the starting resistance network to produce a further incremental increase of motor speed.

The preceeding arrangement provides for varying motor speed in incremental steps responsive to the speed control signal. It is, however, desirable to provide a smooth, stepless control. This is achieved by time ratio, or pulse width, modulation of the signals on outputs 100, 102 and 104. Time ratio waveform generator 126 produces periodically varying signals of predeterminded frequency. These signals are combined with the speed control such that changes of the speed control signal representative of calls for increasing motor speed successively produces on the different ones of outputs 100, 102 and 104, a train of enabling pulses varying in duty cycle from a predetermined minimum to a predetermined maximum, e.g. full turn on, such that the effective resistance of each of the parallel connected networks is successively smoothly decreased to the resistance means in the network.

In the arrangement of FIG. 1, generator 126 supplies a continuous train of triangular waves of predetermined frequency to a second input of summation circuit 106. The combined speed control signal and triangular waves are coupled from the output of circuit 106 through inverter 108 to a first input of each of AND gates 110, 112 and 114. This combined, i.e. summation, signal comprises the triangular wave signal varying about the level of the speed control signal. When the speed control signal has an amplitude such that the most positive portion of the summation signal briefly exceeds the amplitude of the reference signal applied to the second input of AND gate 110, the AND gate output is during such brief interval switch to the binary one state. This produces a short enabling pulse on line 110. As the amplitude of the speed control signal is increased, the amplitude of the triangular summation signal will exceed the reference potential for a longer time. As a result, the output 110 of the AND gate will have a wider enabling pulse. The preceeding constitutes a form of amplitude to pulse width conversion. The width of the enabling pulses produced by AND gate 102 on output 110 is proportional to the amplitude of the speed control signal. As the speed control signal amplitude is increased, the width of successive enabling pulses increases. The frequency of the triangular waves remains constant during the above-described switching process, and the enabling pulses on output line 100 recur at the same constant frequency, and therefore, have a duty cycle proportional to the amplitude of the speed control signal. During intervals when the speed control signal has an amplitude, such that the minimum amplitude of the triangular summation signal equals or exceeds the reference potential applied to the second input of AND gate 110, output 100 remains at the binary one level. Accordingly, as the amplitude of the speed control signal is increased, representative of calls for increasing motor speed, the duty cycle of the pulses on output 100 increases to 100%, at which time, output 100 has a continuous binary one, enabling level, i.e. the previously referenced second predetermined voltage level.

Further amplitude increased of the speed control signal, similarly, produce enabling pulses of increasing duty cycle on output 102 of AND gate 112, and subsequently produce enabling pulses of increasing duty cycle on the output 104 of AND gate 114. This continuous amplitude increase of the speed control, representative of calls for increasing motor speed, results in consecutive ones of the AND gates producing at their outputs a train of enabling pulses whose duty cycle increases of full turn on. This provides smooth control of the motor speed in response to the speed control signal.

The frequency of the recurring triangular waves is selected such that the enabling pulses on any output line have a frequency lower than the instantaneous frequency of the signal supplied by the motor rotor winding. The frequency of the current supplied by the motor rotor winding is of course inversely related to motor speed. It is zero at synchronous speed, one half the line frequency at half speed, and it equals the line frequency at zero speed, i.e. blocked rotor conditions. Assuming a 60 hertz line frequency and a 40% starting speed, the rotor frequency will vary from 36 hertz at the starting speed toward a very low frequency. A triangular waveform frequency of, for example, 2 hertz might be utilized over most of the speed range extending upward from starting speed.

In a preferred embodiment, provision is made to reduce the enabling pulse frequency during the highest speed range interval when the rotor frequency decreases toward zero. This avoids enabling pulses from having a frequency approximating the instantaneous rotor frequency. Otherwise, there could be phasing problems producing modulation distortion and jerky, or rough running, motor performance. Accordingly, in the preferred embodiment, the time ratio, or triangular waveform, generator 126, normally provides a waveform output having a first predetermined frequency, e.g. 2 hertz, but its output may be switched by an external signal to a lower predetermined frequency, such as, for example, one cycle every seven seconds. Generator 126 produces the lower frequency during high speed, i.e. low rotor frequency, operation when enabling pulses are produced on output 104 of AND gate 114. This may be accomplished by time base shift device 128 whose inputs are coupled to the output of inverter 108 and to the junction of resistors 122 and 124. When device 128 detects that the speed control signal exceeds a predetermined amplitude, such as the reference potential at the junction, it provides a signal to time ratio generator 126 causing the latter to produce waveforms of the lower frequency.

The AND gates 110, 112 and 114 each constitute time ratio modulating means providing on outputs 100, 102 and 104 signals which, depending on the amplitude of the speed control signal, may have a continuous first predetermined level (i.e. binary 0), a continuous second predetermined level (i.e. binary 1), or a train of pulses whose duty cycle is a function of the amplitude of the speed control signal.

While an output has a continuous binary zero, i.e. first predetermined output lever, no firing pulses are applied to the thyristors associated with that output. These thyristors remain cut off and the networks containing the cut off thyristors essentially have an infinite impedance.

While an output has a continuous binary one, i.e. second predetermined level, a continuous train of firing pulses is applied to the thyristors associated with that output. The output thus provides for continuously firing the thyristor of the network in each phase circuit, e.g. output 100 controls thyristors 44, 50 and 56 of networks 10a, 12b and 14c. Each of these networks being connected to a different phase output of the rotor winding, conducts during 120° positive and 120° negative conduction intervals separated by 60° off time. The effective resistance of each network then essentially comprises the resistance means, connected in series with the thyristor in the network. The resistance value of the resistance means of determined by the parameters of the motor and the control system. For example, in one type of the system, the resistance of the starting network was established at 140 percent ohms to provide appropriate starting torque at 40 percent synchronous speed. (Percent ohms is defined such that a secondary resistance providing rated torque at zero speed equals one hundred percent ohms.) The effective resistance provided by the resistors 26, 32 and 38 of networks 10a, 12a and 14a was, for example, established at 25 percent ohms. The effective resistance provided by the resistors of networks 10b, 12b and 14b was, for example, established at 15 percent ohms. The effective resistance provided by the resistors of networks 10c, 12c and 14c was, for example, established at 10 percent ohms.

When an output, i.e. 100, 102 or 104, comprises a train of enabling pulses, firing pulses are applied to the thyristors, associated with that output, only during the time duration of each enabling pulse. The thyristors are thus gated on for periodic intervals, and the effective resistance of the networks including these thyristors is variable from infinity to the value of the resistance means, as a function of the duty cycle of the enabling pulse train supplied by the outputs (100, 102 or 104). The frequency of the pulses on outputs 100, 102 and 104 is lower than, and asynchronous with, the instantaneous rotor frequency. Therefore, the production of high frequency harmonics is minimized. The frequency of the enabling pulses is, however, maintained high enough in respect to the instantaneous rotor frequency to prevent undesirable motor acceleration or deceleration.

Figure 2:
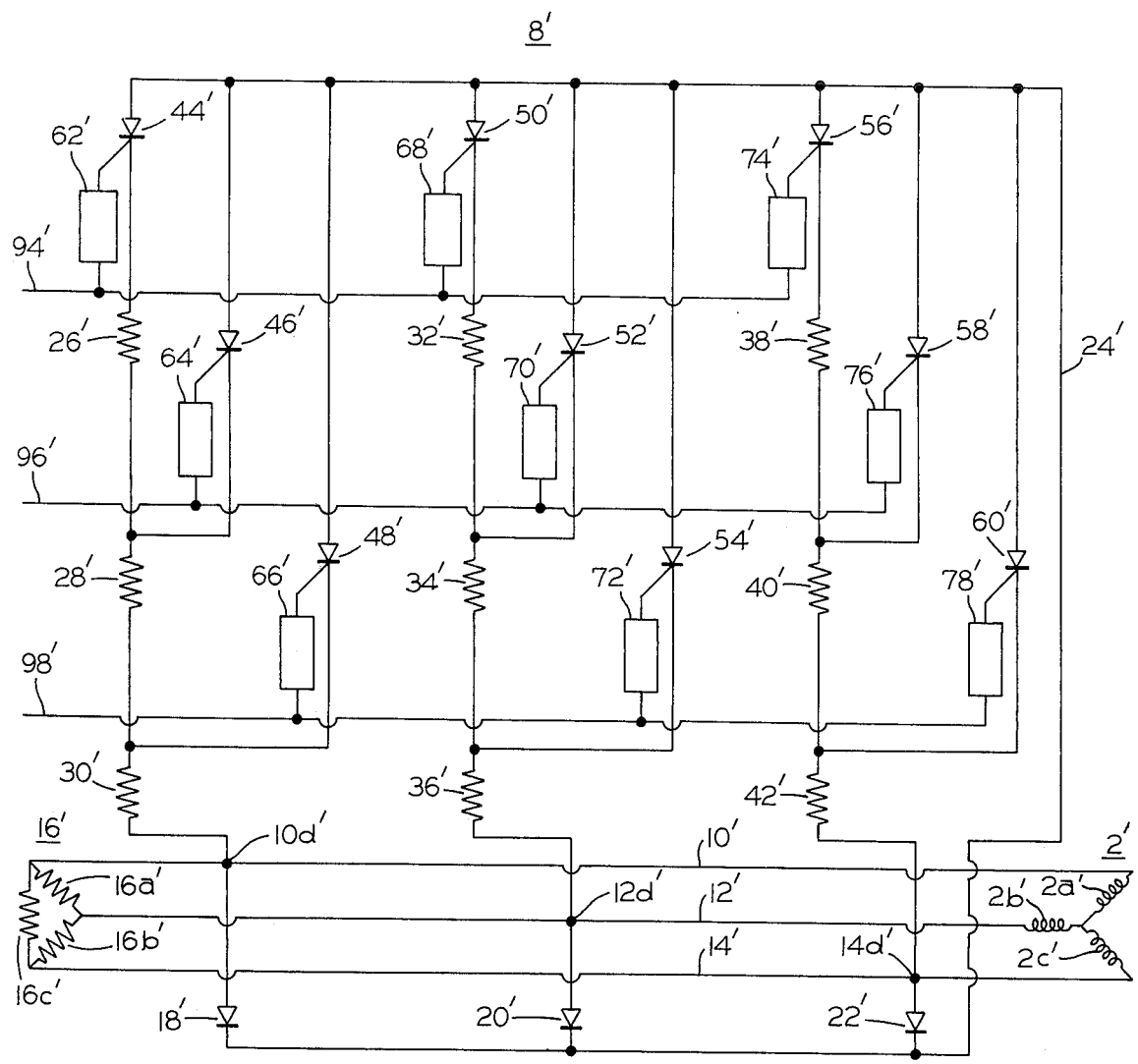
FIG. 2 is a simplified schematic diagram of an alternative embodiment of the polyphase network of the static motor speed control circuit.

FIG. 2 illustrates an alternative embodiment of the polyphase network 8 of the static speed control system. This arrangement utilizes the same components as the polyphase network 8 illustrated in FIG. 1, arranged, however, with the resistors of each phase circuit being connected in series instead of in parallel. The components of FIG. 2 are identified with the same numerals as corresponding components of FIG. 1, except for being distinguished by a prime suffix.

The second leg of each phase circuit of the modified bridge has its three resistors connected in series instead of in parallel. The second legs are connected from a common end terminal, i.e. line 24' to respectively end terminals 10d', 12d' and 14d'. A series circuit, comprising in the order named, resistors 30', 28' and 26' and silicon controlled rectifier 44 is connected from terminal 10d' on line 10 to line 24'. The anode of diode 44' is connected to line 24'. Similarly, terminal 12d' of line 12' is connected to a series circuit comprising, resistors 36', 34', 32' and silicon controlled rectifier 50', whose anode is connected to line 24'. Terminal 14d' of line 14 is connected to a series circuit comprising resitors 42', 40', 38' and silicon controlled rectifier 56', whose anode is connected to line 24'.

All silicon controlled rectifiers have their anodes connected to line 24', as in the arrangement of FIG. 1. However, the thyristors of each phase leg have their cathodes connected to different terminals of the network comprising the serially connected resistors. Thus, in the phase leg comprising resistors connected to line 10', the cathode of SCR 44' is connected to one end terminal of resistor 26'. The cathode of SCR 46' is connected to the other end terminal of that resistor at the junction of resistors 26' and 28'. The cathode of SCR 48' is connected to the junction of resistors 28' and 30'.

Similarly, in the phase leg comprising resistors connected to line 12', the cathode of SCR 50' is connected to one end terminal of resistor 32'. The cathode of SCR 50' is connected to the junction of resistors 32' and 34'. The cathode of SCR 54' is connected to the junction of resistors 34' and 36'.

In the phase leg comprising resistors connected to line 14', the cathode of SCR 56' is connected to one end terminal of resistor 38'. The cathode of SCR 58' is connected to the junction of resistors 38' and 40'. The cathode of SCR 60' is connected to the junction of resistors 40' and 42'. The remaining connections conform to the arrangement of FIG. 1, including in respect to the rotor winding 2', starting network 16', unilaterally conducting means 18', 20' and 22', and as to the thyristor gating means 62', 64', 66', 68' 70', 72', 74', 76' and 78'.

Since each of the second phase legs operate in a similar manner, operation will be described in connection with the phase leg connected to line 10'. When no firing signals appear on lines 94', 96' and 98', silicon controlled rectifiers 44', 46' and 48' do not conduct, and the phase leg comprising these resistors has a substantially infinite resistance. When firing signals on line 94' cause pulse transformer 62' to fire, i.e. gate on, SCR 44', the resistance of the phase leg, i.e. between line 24' and terminal 10d' equals the series resistance of resistors 26', 28' and 30'. When firing signals are additionally applied on line 96', SCR 46' conducts so as to connect line 24' to the junction of resistors 26' and 28'. This reduces the resistance of the phase leg to the sum of the resistances of resistors 28' and 30'. When firing pulse signals are additionally applied on line 98', SCR 48' conducts and effectively connects line 24' to the junction of resistors 28' and 30'. This reduces the resistance of the phase leg to the resistance of resistor 30'.

It can be seen that the arrangement of FIG. 2 operates similarly to that of FIG. 1, with the exception that variation of resistance is obtained by shunting increments of series resistance, instead of by adding resistances in parallel.

The invention may be utilized with different types of circuitry. Alternative configurations may be used for the starting network, pulse width conversion system, and the gating means. Appropriate anti-jerk or rate control circuits for the speed control signal may be incorporated.

Various changes, modifications and substitutions may be made in the embodiment described herein without departing from the true scope and spirit of the invention as defined in the appended claims.

What I claim as new and desire to secure by Letters Patent of the United States is:

1. A rotor current control circuit adapted to modify the speed of a wound rotor motor by modifying the effective resistance of a polyphase network comprising a plurality of interconnected phase circuits adapted to be connected to the multiple phase rotor windings of the motor, comprising:
   a. each of said phase circuits comprising a plurality of parallel connected series networks;
   b. each of said series networks comprising resistance means and thyristor means connected to be self-commutated by the phase signals induced in the phase windings of the rotor windings;
   c. a source of speed control signal whose magnitude is representative of the desired speed of said wound rotor motor;
   d. control means comprising an input coupled to said source, and a plurality of outputs;
   e. gating means coupled from each of one of said outputs to gate on the thyristor means in a specified one of said series networks of each phase circuit; and
   f. said control means being constructed to sequentially produce signals on consecutive ones of said outputs responsive to magnitude changes of said speed control signal representative of calls for increasing motor speed to consecutively gate on the thyristor means of additional ones of said parallel connected networks of each phase circuit so that the resistance means of additional ones of said parallel connected series networks are inserted in parallel in each phase circuit.

2. The rotor current control circuit of claim 1 wherein said control means comprises:
   a. a plurality of AND circuits, each comprising a first and a second input and an output;
   b. means for coupling the first input of each of said AND circuits to said source of speed control signal;
   c. a voltage divider circuit;
   d. means for coupling the second input of each of said AND circuits to said voltage divider circuit to apply different reference potentials to the second inputs of each of said AND circuits; and
   e. the output of each of said AND circuits being coupled to the input of a different one of said gating means and collectively constituting the outputs of said control means.

3. The arrangement of claim 1 wherein said control means further comprises:
   a. a waveform generator producing periodically varying signals at a frequency asynchronous to the frequency of said rotor winding;
   b. modulating means responsive to said periodically varying signals to produce time ratio modulating signals on said outputs such that changes of said speed control signal representative of calls for increasing motor speed sequentially produces on consecutive ones of said outputs a train of pulse width modulated pulses varying from a predetermined minimum to a predetermined maximum duty cycle such that the effective resistance of said parallel connected series networks is smoothly decreased; and
   c. said waveform generator being operative to produce said periodically varying signals at frequencies selected such that the frequency of said train of pulses appearing on any of said outputs is less than the instantaneous frequency of the current coupled from said rotor winding to said bridge.

4. The arrangement of claim 3:
   a. wherein said modulating means comprises a plurality of time ratio modulation means each comprising an output constituting one of the outputs of said control means;
   b. said control means further comprising a source for providing a different potential to each of said modulating means; and
   c. each of said modulation means being responsive to said speed control signal, one of said reference potentials, and to said periodically varying signals to produce at its output a train of repetitive pulses commencing with minimum duty cycle at a first predetermined magnitude of said speed control signal and varying in duty cycle as a function of desired motor speed to a maximum duty cycle at a second prdetermined magnitude of said speed control signal, said first and second predetermined magnitudes of each of said time ratio modulation means being different.

5. The arrangement of claim 4 wherein each of said time ratio modulating means comprises an AND gate.

6. The arrangement of claim 4 wherein said gating means comprises:
   a. pulse generating means for producing periodically recurring signals of a frequency substantially greater than the instantaneous frequency of the phase signals induced in said rotor winding; and
   b. means for modulating the outputs of said modulating means with the signals produced by said pulse generating means.

7. The rotor current control circuit of claim 4 for a bridge type of polyphase network wherein each of said phase circuits additionally comprises free wheeling unilaterally conducting means.

8. The arrangement of claim 5 wherein said polyphase network comprises additional resistance means constituting a motor starting resistance network.

9. A rotor current control circuit for modifying the speed at a three phase full wave bridge whose three phase terminals are adapted to be connected to the terminals of the motor rotor windings, comprising:
   a. a first leg of each of the three phase circuits of said bridge comprising unilaterally conducting means;
   b. a second leg of each of the three phase circuits of said bridge comprising a plurality of resistance means and a plurality of thyristor means connected between first and second end terminals of said second leg;
   c. each phase terminal of said bridge being connected to one terminal of said unilaterally conducting means and to one end terminal of the second leg of one of said phase circuits;
   d. means for interconnecting the other terminal of all of said unilaterally conducting means and the other end terminal of each second leg;
   e. said thyristor means and resistance means being connected such that conduction of additional ones of said thyristor means of the second leg incrementally reduces the resistance between said first and second end terminals;
   f. said unilaterally conducting means being poled in one direction and the thyristor means of each second leg being poled in the opposite direction such that current flow between any phase terminal and its first phase leg is in opposing direction to current flow between said phase terminal and its second phase leg;
   g. a source of speed control signal whose magnitude is representative of the desired speed of said wound rotor motor;

h. control means comprising an input coupled to said source and a plurality of outputs;

i. gating means coupled from each of said plurality outputs and connected to gate on a specified one of said thyristor means of the second leg in each of the three phase circuits; and j. said control means being constructed to sequentially produce signals on consecutive ones of said outputs responsive to magnitude changes of said speed control signal representative of calls for increasing motor speed to consecutively gate on additional ones of said thyristor means in each of the three phase circuits so that the resistance between said first and second end terminals of each second leg is reduced.

10. The rotor current control circuit of claim 9 wherein said control means comprises:

a. a plurality of AND circuits each comprising a first and a second input and an output;

b. means for coupling the first input of each of said AND circuits to said source of speed control signal;

c. a voltage divider circuit;

d. means for coupling the second input of each of said AND circuits to said voltage divider circuit to apply different reference potentials to the second input of each of said AND circuits; and e. means for coupling the output of each of said AND circuits to the input of a different one of said thyristor gating means.

11. The arrangement of claim 9 wherein said control means further comprises:

a. a waveform generator producing periodically varying signals at frequencies asynchronous to the frequency of the current coupled from said rotor winding to said bridge;

b. modulation means responsive to said periodically varying signals and said source of speed control signals such that changes of said speed control signal representative of calls for increasing motor speed, successively produces on different ones of said outputs, a train of pulses varying in duty cycle from a predetermined minimum to a predetermined maximum duty cycle such that additional ones of the thyristor means of each second leg are successively staged on and the effective resistance of each second leg is smoothly decreased; and c. said waveform generator being operative to produce said periodically varying signals at frequencies selected such that the frequency of said train of pulses appearing on any of said outputs is substantially less than the instantaneous frequency of the current coupled from said rotor winding to said bridge.

12. The arrangement of claim 11 comprising additional resistance means interconnected to each phase terminals of said bridge, said additional resistance means having a resistance value selected to provide an appropriate motor start speed/torque combination.

13. The arrangement of claim 11 wherein said train of pulses appearing on at least one of said outputs during conditions of low motor speed has a preselected frequency lower than the frequency of the train of pulses appearing on another one of said outputs during conditions of higher motor speed.

14. The arrangement of claim 11:

a. wherein said modulating means comprises a plurality of time ratio modulation means each comprising an output constituting one of the outputs of said control means;

b. said control means further comprising a source for providing a different reference potential to each of said modulating means; and c. each of said time ratio modulation means being responsive to said speech control signal, one of said reference potentials, and to said periodically varying signals to produce at its output a train of repetitive pulses commencing with minimum duty cycle at a first predetermined magnitude of said speed control signal and varying in duty cycle as a function of desired motor speed to a maximum duty cycle at a second predetermined magnitude of said speed control signal, said first and second predetermined magnitudes differing for each of said time ratio modulation means.

15. The arrangement of claim 13 wherein said time ratio modulating means comprises an AND circuit comprising first and second imputs and an output, said first input being coupled to said source of speed control signal and said waveform generator and said second input being coupled to one of said reference potentials.

16. The arrangement of claim 11 wherein the second leg of each phase circuit comprises said plurality of resistance means coupled in series circuit between said first and second end terminals and thyristor means are connected in shunt with respective ones of said resistance means such that gating on additional ones of said thyristor means reduces the resistance between said first and second end terminals.

17. The arrangement of claim 16 wherein each second leg comprises one of said thyristor means connected in series circuit with said resistance means between said first and second end terminals.

18. The arrangement of claim 11 wherein:

a. each second leg comprises a plurality of networks connected in parallel between said first and second end terminals;

b. each of said networks comprises resistance means and thyristor means connected in series circuit; and c. said gating means being coupled from each one of said outputs and connected to gate on the thyristor means in a specified network of each phase circuit, such that thyristor means of additional ones of said parallel connected networks of each phase circuit are consecutively gated on responsive to magnitude changes of said speed control signal representative of calls for increasing motor speed.

* * * * *